United States Patent
Albright

(10) Patent No.: US 10,378,520 B2
(45) Date of Patent: Aug. 13, 2019

(54) ACTUATION MECHANISM AND ASSOCIATED METHODS

(71) Applicant: Marotta Controls, Inc., Montville, NJ (US)

(72) Inventor: John E. Albright, Hackettstown, NJ (US)

(73) Assignee: Marotta Controls, Inc., Montville, NJ (US)

(*) Notice: Subject to any disclaimer, the term of this patent is extended or adjusted under 35 U.S.C. 154(b) by 0 days.

(21) Appl. No.: 16/043,500

(22) Filed: Jul. 24, 2018

(65) Prior Publication Data

US 2018/0328348 A1 Nov. 15, 2018

Related U.S. Application Data

(62) Division of application No. 15/004,228, filed on Jan. 22, 2016, now Pat. No. 10,041,481.

(51) Int. Cl.
| | | |
|---|---|---|
| *F03G 7/06* | (2006.01) | |
| *F42B 10/64* | (2006.01) | |
| *F42B 10/14* | (2006.01) | |

(52) U.S. Cl.
CPC .............. *F03G 7/065* (2013.01); *F42B 10/14* (2013.01); *F42B 10/64* (2013.01)

(58) Field of Classification Search
CPC .... F03G 7/065; F05C 2251/08; F16K 1/2007; F16K 1/2028; F16K 31/002; F42B 10/14; F42B 10/64; Y10T 137/7724; Y10T 137/773

See application file for complete search history.

(56) References Cited

U.S. PATENT DOCUMENTS

| | | | | | |
|---|---|---|---|---|---|
| 1,479,789 | A | * | 1/1924 | Collin | F16K 17/386 123/179.15 |
| 2,425,000 | A | * | 8/1947 | Paget | B64D 13/02 123/70 R |
| 2,717,494 | A | * | 9/1955 | Doeg | F25B 47/022 137/457 |
| 3,143,126 | A | * | 8/1964 | Terry | F24H 9/20 137/457 |
| 3,313,312 | A | * | 4/1967 | Weese | G05D 23/022 137/457 |
| 4,318,509 | A | * | 3/1982 | Patrick | G05D 23/138 137/85 |
| 4,549,717 | A | * | 10/1985 | Dewaegheneire | F16K 17/38 137/457 |

(Continued)

OTHER PUBLICATIONS

Extended European Search Report for Application No. EP17152270.9 dated Jun. 22, 2017.

*Primary Examiner* — Medhat Badawi
(74) *Attorney, Agent, or Firm* — Lerner, David, Littenberg, Krumholz & Mentlik, LLP

(57) ABSTRACT

An actuation mechanism used in, for example, a missile assembly is disclosed, as are methods of its use. The actuation mechanism is locked in a first orientation and is unlocked in a second orientation. Locking and unlocking of the actuation mechanism is achieved by way of a locking mechanism that responds to a certain stimulus. In some embodiments, the actuation mechanism is incorporated into a sub-assembly of a missile to assist in controlling the missile's flight.

9 Claims, 6 Drawing Sheets

(56) References Cited

U.S. PATENT DOCUMENTS

| | | | | |
|---|---|---|---|---|
| 4,699,314 A * | 10/1987 | Faurie | F16K 31/002 137/875 |
| 4,735,056 A * | 4/1988 | Goodman | B64D 13/08 236/80 A |
| 4,775,117 A * | 10/1988 | Standke | B64D 15/20 244/134 B |
| 4,802,621 A * | 2/1989 | Standke | G05D 23/138 137/625.3 |
| 4,932,429 A * | 6/1990 | Watanabe | E03B 7/12 116/218 |
| 5,417,367 A * | 5/1995 | Baclet | F02M 31/07 236/101 D |
| 5,878,949 A * | 3/1999 | Matsui | G05D 23/025 137/509 |
| 6,085,871 A * | 7/2000 | Karamata | F16N 7/36 137/807 |
| 6,241,231 B1 * | 6/2001 | Schron, Jr. | B25B 5/06 269/216 |
| 6,367,253 B2 * | 4/2002 | Kutlucinar | F03G 7/065 244/102 A |
| 6,427,712 B1 * | 8/2002 | Ashurst | E03B 7/10 137/2 |
| 6,497,372 B2 * | 12/2002 | Lee | G05D 23/025 236/101 D |
| 6,550,495 B1 * | 4/2003 | Schulze | F16K 17/38 137/457 |
| 6,584,940 B1 * | 7/2003 | Khadkikar | F23M 9/003 122/155.2 |
| 9,334,675 B2 * | 5/2016 | Koehler | E05B 47/0009 |
| 9,617,921 B2 * | 4/2017 | Biyani | F01D 5/082 |
| 2007/0028964 A1 * | 2/2007 | Vasquez | F03G 7/065 137/457 |
| 2009/0114549 A1 * | 5/2009 | Albright, Jr. | B24B 37/16 205/710 |
| 2010/0215424 A1 * | 8/2010 | Crookston | B64G 1/222 403/6 |
| 2014/0021289 A1 * | 1/2014 | Bugge | F42B 10/14 244/3.24 |
| 2015/0165114 A1 * | 6/2015 | Grant | A61M 5/14586 604/151 |
| 2016/0047363 A1 * | 2/2016 | Alacqua | F03G 7/065 251/213 |
| 2017/0067725 A1 * | 3/2017 | Hammond | F42B 10/14 |
| 2017/0211551 A1 * | 7/2017 | Albright | F42B 10/14 |

\* cited by examiner

ACTUATION MECHANISM AND ASSOCIATED METHODS

BACKGROUND OF THE INVENTION

This application is a divisional of U.S. application Ser. No. 15/004,228, filed on Jan. 22, 2016, the disclosure of which is incorporated herein by reference.

The present invention relates to an actuation mechanism and associated methods of use, for example in military applications.

Certain military devices (and devices in other industries) require actuation mechanisms that are fast-acting and responsive in a reliable manner. As an example, missile technologies use actuation mechanisms that lock or unlock the missile's flight controls. Frequently, these actuation mechanisms are a "single use" device. In other words, after triggering the actuation mechanism, it is no longer usable. In this way, it can be difficult to test or validate certain actuation mechanisms for field operation. Other downfalls of common actuation mechanisms are also present.

It is therefore an object of the present invention to provide an actuation mechanism and associated systems and methods that improve upon existing devices.

BRIEF SUMMARY OF THE INVENTION

A first aspect of the invention includes an actuation mechanism comprising a housing having an internal hollow bore. A plunger is movably positioned inside the hollow bore of the housing, and a locking mechanism is movable between a first position configured to lock the plunger relative to the housing and a second position configured to unlock the plunger relative to the housing. The actuation mechanism also comprises a piston having a body and a wire engaged to the piston and the plunger, the wire being composed of a material configured to change its length in response to a stimulus, wherein when the wire is subjected to the stimulus, the wire changes its length and moves the piston from a first position to a second position, which causes the locking mechanism to move from its first position to its second position and unlock the plunger relative to the housing.

In embodiments of this first aspect, the wire is composed of a material selected from the group consisting of a shape-memory alloy and a nickel-titanium shape memory alloy.

A second aspect of the invention includes a method of operating an actuation mechanism comprising: (1) positioning a plunger inside a bore in a housing, such that the plunger is locked relative to the housing, (2) fixedly engaging a wire to a piston and to the plunger, and (3) subjecting the wire to a stimulus so that the wire changes its length and causes the piston to move from a first position to a second position, the movement of the piston from the first position to the second position serving to unlock the plunger relative to the housing so that the plunger is free to move inside the bore relative to the housing. Although numbered steps are provided above, it is to be understood that no particular order of steps is required for the method.

In embodiments of the second aspect, the stimulus is an electric current, a temperature stimulus, or a combination thereof. In addition, the piston may have at least one internal channel with the wire extending through the at least one internal channel.

BRIEF DESCRIPTION OF THE DRAWINGS

A more complete appreciation of the subject matter of the present invention and of the various advantages thereof can be realized by reference to the following detailed description in which reference is made to the accompanying drawings in which.

DETAILED DESCRIPTION

In describing certain aspects of the present invention, specific terminology will be used for the sake of clarity. However, the invention is not intended to be limited to any specific terms used herein, and it is to be understood that each specific term includes all technical equivalents, which operate in a similar manner to accomplish a similar purpose.

Figure 1A:
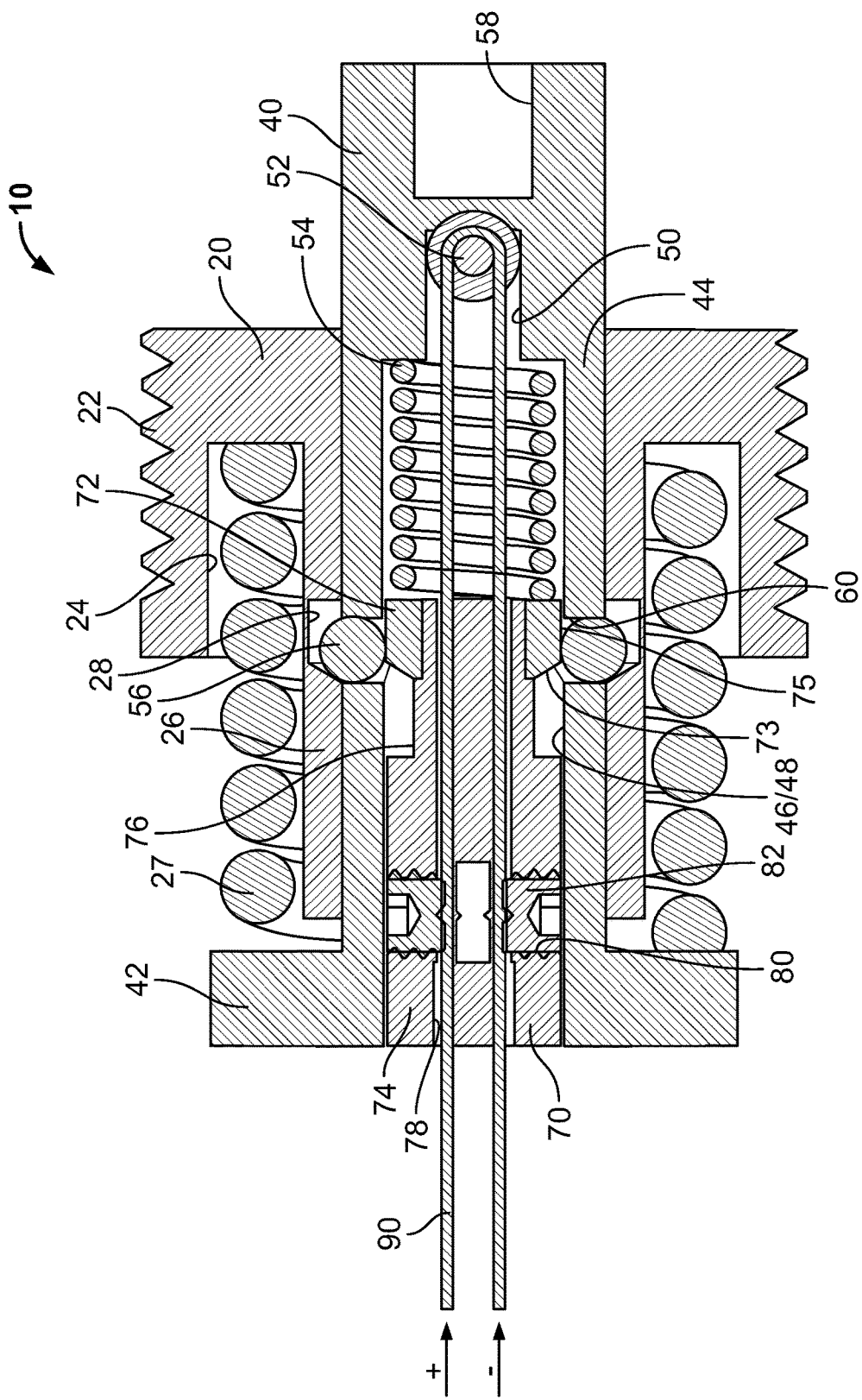
FIGS. 1A-B are cross-sectional views of an actuation mechanism, shown in locked and unlocked positions.
Figure 1B:
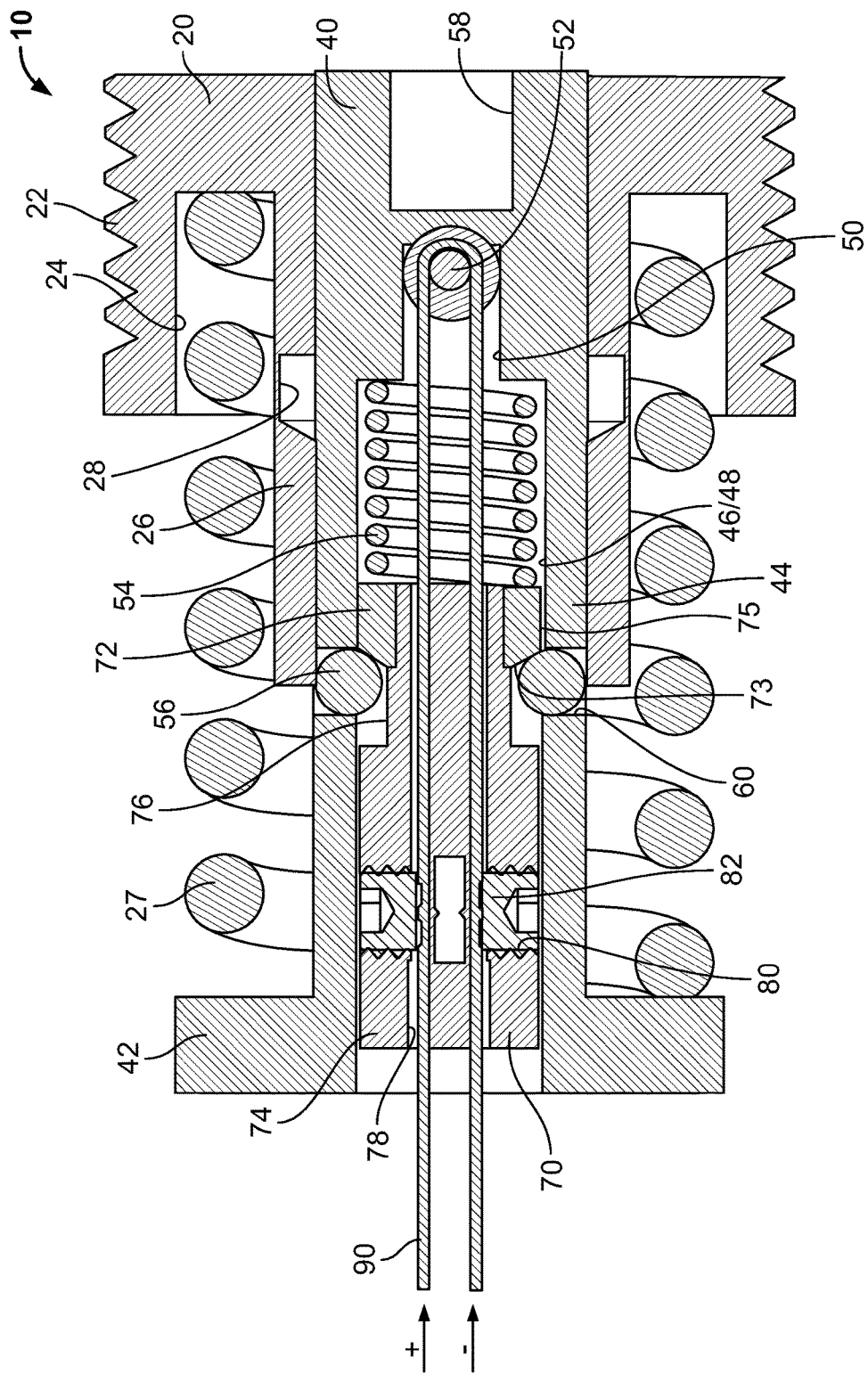

FIGS. 1A-B are cross-sectional views of an actuation mechanism 10 used in, for example, military applications. In a particular embodiment, actuation mechanism 10 is used in a sub-assembly of a missile system, as shown in more detail in FIGS. 2 and 3A-B. Actuation mechanism 10 can be used to trigger or allow operation of a control assembly in the missile for controlling the missile's flight mechanisms (e.g., its fins). Other applications for actuation mechanism 10 are, of course, possible as described in more detail below.

Figure 2:
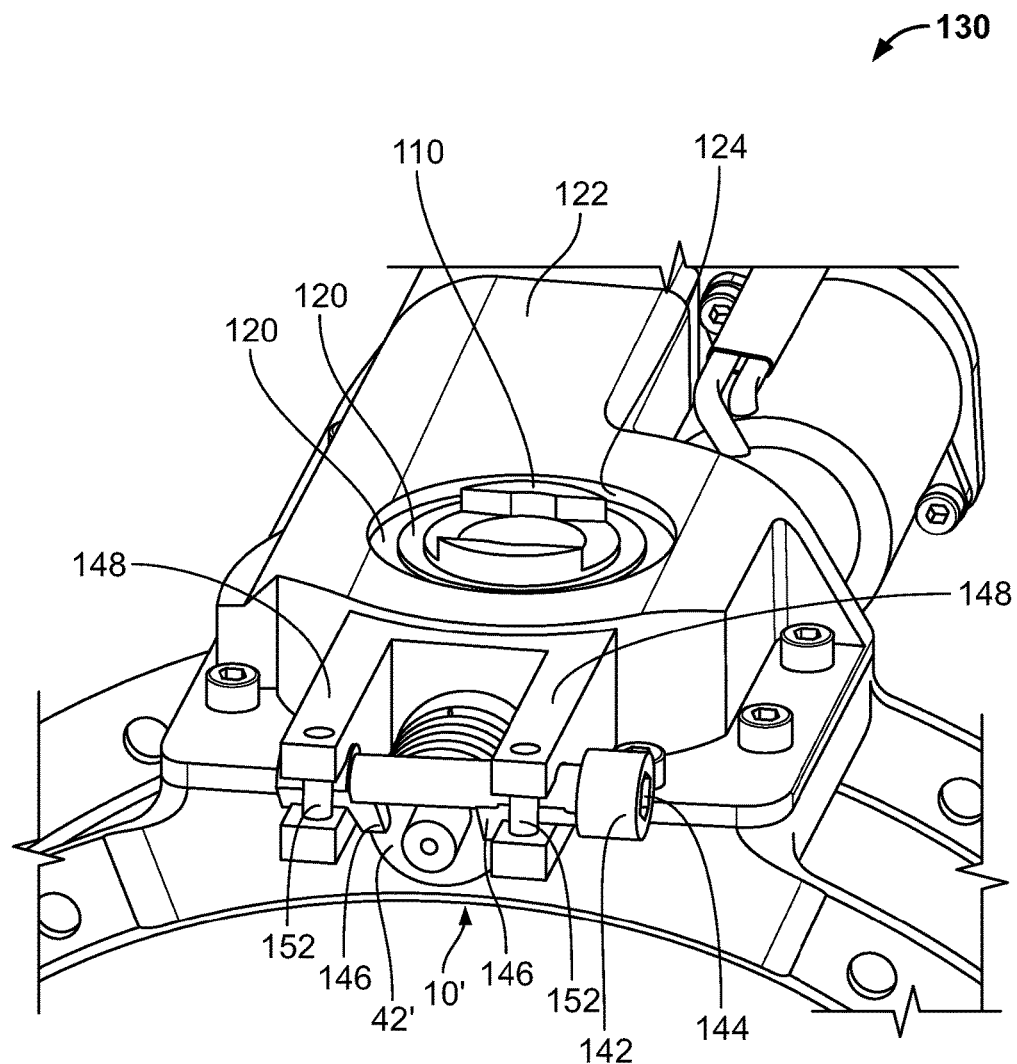
FIG. 2 is a perspective view of an exemplary missile sub-assembly in which the actuation mechanism of FIGS. 1A-B can be used.
Figure 3A:
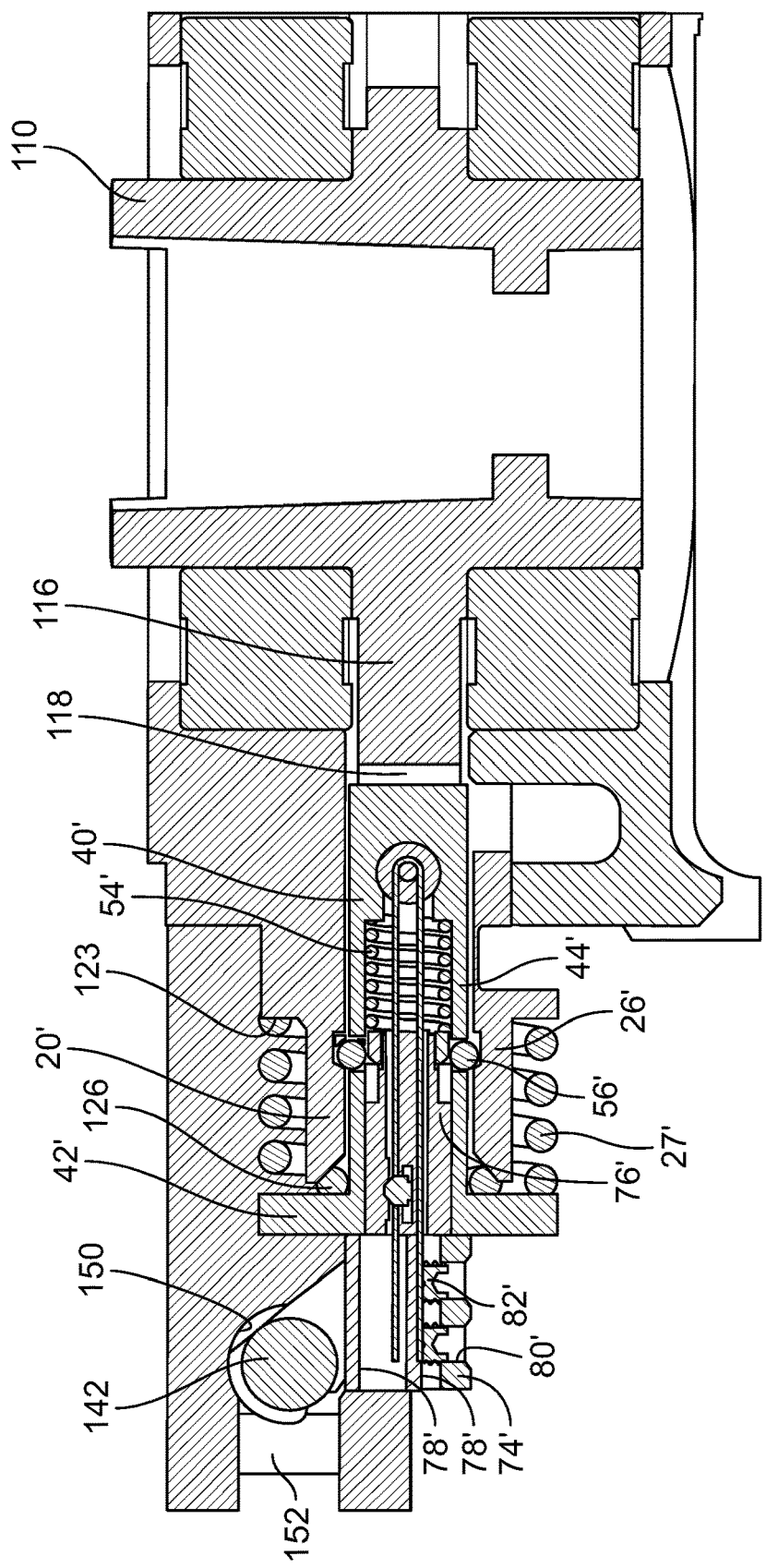
FIGS. 3A-B are cross-sectional views of the sub-assembly of FIG. 2, showing an alternate embodiment of the actuation mechanism of FIGS. 1A-B in locked and unlocked positions.
Figure 3B:
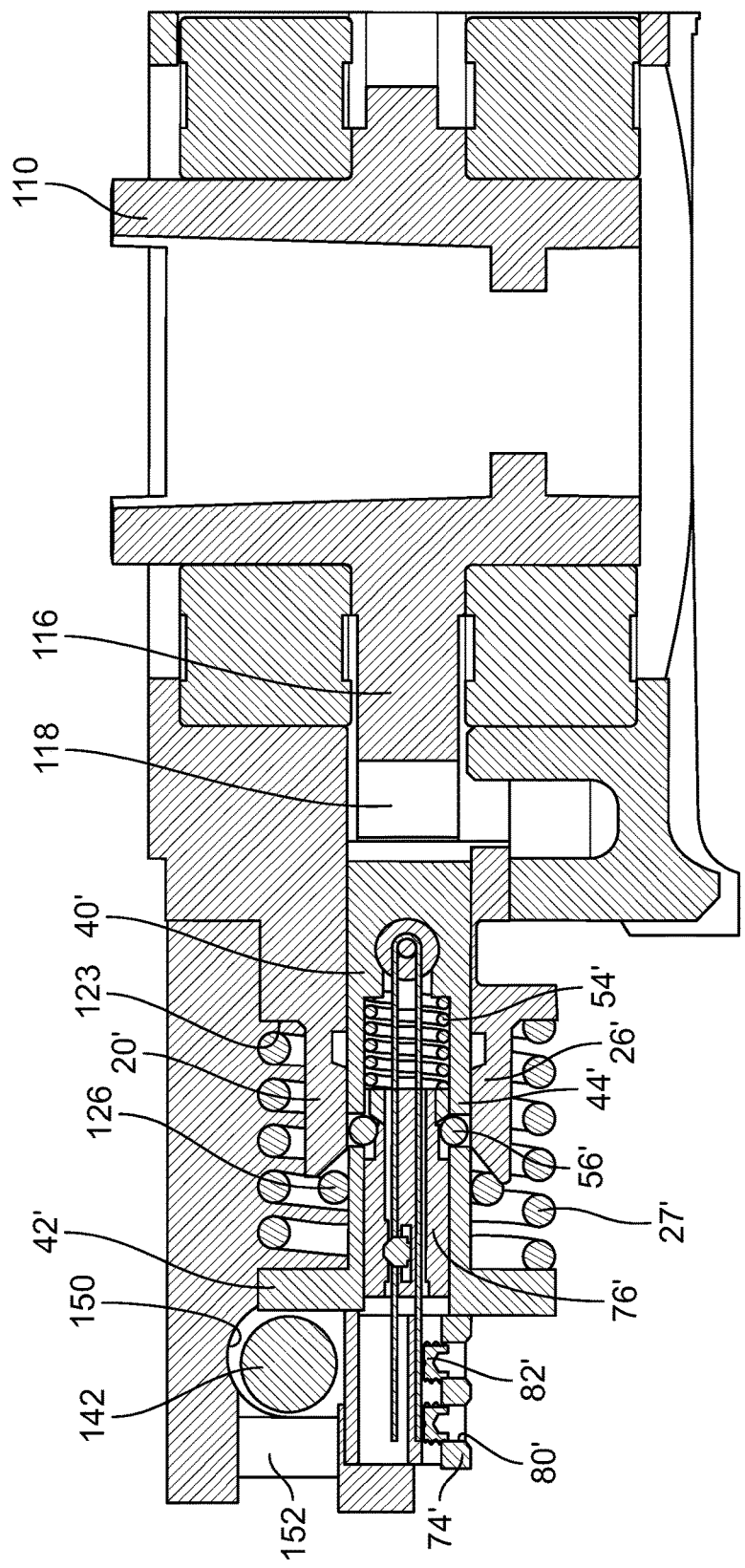

Referring to FIGS. 1A-B, actuation mechanism 10 includes a fixed housing 20 that, in an embodiment, has an outer threaded area 22 for connection with another structure. Alternative connection mechanisms besides threading may also be used (e.g., press-fit, bayoneted connection, welding, etc.). In addition, as shown in FIGS. 2 and 3A-B, fixed housing 20 is in an alternate embodiment incorporated or monolithic with another structure, such as a portion of a missile sub-assembly. Fixed housing 20 includes a hollow shaft 26 and a groove 24 positioned between shaft 26 and threaded area 22 for receiving a spring 27 or other flexible member (e.g., a flexible disc).

Hollow shaft 26 of fixed housing 20 has a length that is greater than that of threaded area 22, such that shaft 26 extends outwards from threaded area 22. Hollow shaft 26 is a cylindrical shaft, in an embodiment, with a hollow inside to house additional components of actuation mechanism 10. As an example, a plunger 40 and piston 70 mechanism can be positioned inside of hollow shaft 26, as illustrated in FIGS. 1A-B.

Inside of hollow shaft 26 is a plunger 40 that is movable relative to shaft 26. Thus, the diameter of hollow shaft 26 is only slightly larger than the diameter of plunger 40 so that plunger 40 can fit within hollow shaft 26 in a movable relationship. In other words, the diameters of hollow shaft 26 and plunger 40 are such that plunger 40 can fit tightly within hollow shaft 26, yet still slide along the inside of shaft 26 in either direction. In an exemplary embodiment, the diameter of hollow shaft 26 is 260 mm while the diameter of plunger 40 is 259 mm.

As shown in FIGS. 1A-B, plunger 40 has a flange 42 at a first end, and a partly hollow shaft 44 extending from flange 42. At a second end, plunger 40 has a reset mechanism 58, which in an embodiment is a threaded bore. An internal cavity 46 extends into plunger 40 adjacent flange 42 for housing piston 70. Internal cavity 46 is a stepped cavity, in an embodiment, which has a larger diameter section 48 and a smaller diameter section 50 between which a step is located. Smaller diameter section 50 of internal cavity 46 houses a fixed member 52 (e.g., a fixed cylindrical post), while larger diameter section 48 houses a piston 70 and spring 54 mechanism. Larger diameter section 48 may also include multiple openings 60 for receiving balls 56, which form a part of a locking mechanism as described below. Although multiple openings 60 and balls 56 are shown, it is equally contemplated that a single opening 60 and ball 56 could be used, or more than two (2) openings 60 and balls 56 could be used. Openings 60 and balls 56 work in conjunction with one or more recesses or grooves 28 of fixed housing 20 to lock housing 20 relative to plunger 40, as set forth in detail below. In some instances, a single groove 28 extends circumferentially about the inside of shaft 26 of fixed housing 20, although in other cases a simple recess or recesses 28 formed along only part of the inside of shaft 26 could also be used. As an example, multiple recesses 28 may be provided, with one recess 28 being available for each ball 56 and having a dimension/geometry configured to retain the relevant ball 56. In a particular embodiment, each recess 28 may have a tapered geometry/section for reasons described below.

Piston 70 is also shown in FIGS. 1A-B. Piston 70 may be positioned inside internal cavity 46 of plunger 40 in an abutting relationship to spring 54 (e.g., a helical spring). Other springs or biasing members—for example a flexible/compressible cylindrical post, a Belleville washer(s), etc.—may be used in place of spring 54, of course. Due to piston 70's position against spring 54, piston 70 can move longitudinally within larger diameter section 48 of internal cavity 56 against the force of spring 54. In an embodiment, piston 70 includes a main body 74 and a stepped shaft 76 extending from main body 74 (e.g., two (2) steps), which includes a bushing 72 on the last step. Bushing 72 may be fixedly adhered to piston 70 as by welding, gluing, or other processes, and it may include a tapered section 73 set at an angle to a straight section 75. In other embodiments, bushing 72 is omitted and the geometry of stepped shaft 76 of piston 70 is monolithically formed to match that of bushing 72. Bushing 72 presents a surface that faces spring 54 to contacts spring 54's coils so that spring 54 may be compressed longitudinally by way of piston 70. For instance, spring 54 may be positioned between bushing 72 and the step between larger and smaller diameter sections 48, 50 and be compressed against the step. As an example, the distance between the step and bushing 72 may be smaller than the uncompressed length of spring 54, placing spring 54 in a compressed state.

Piston 70 also includes internal channels 78 extending through main body 74 and shaft 76 for receiving a wire 90. Wire 90 may extend through channels 78 and around fixed post 52, which is fixedly attached or alternatively monolithic with plunger 40. As described in more detail below, wire 90 may be composed of a shape-memory material or any other material that changes its length (e.g., contracts) when subjected to a certain stimulus (e.g., an electric current, temperature stimulus, etc.) For instance, wire 90 is composed of nickel-titanium shape memory allow, such that wire 90 changes in length, for instance it contracts, when subjected to an electric current. The electric current is provided by an electricity source (e.g., a battery) coupled to wire 90. In a specific embodiment, wire 90 may decrease in length by about 2-10%, more particularly about 4%, when subjected to an appropriate electric current. Thus, the length contraction of wire 90 may be configured so that it generates a sufficient force to overcome the counter-biasing force of spring 54, which is positioned in an abutting relationship to piston 70.

Channels 78 extend entirely through piston 70, in an embodiment, and also intersect with at least one opening 80 in piston 70 for receiving a set screw 82. As shown in FIGS. 1A-B, two (2) openings 80 and two (2) set screws 82 are used, although more or less openings 80 and set screws 82 can be utilized. Openings 80 open out into channels 78 so that set screws 82 can be screwed into openings 80 and pinch wire 90 against a surface of piston 70 to fix wire 90 relative to piston 70. In other embodiments, different structures besides set screws 82 can be used such as, for example, a spring-actuated push button that fixes wire 90, a press-fit mechanism in openings 80 for fixing wire 90, or a quick-release mechanism for fixing wire 90.

Actuation mechanism 10 is shown in a locked position in FIG. 1A and an unlocked position in FIG. 1B. The following describes the movement of actuation mechanism 10 from the locked to unlocked positions. In use, actuation mechanism 10 may be assembled as shown in FIGS. 1A-B—in other words with plunger 40 inside fixed housing 20, piston 70 and springs 27, 54 in place, and wire 90 extending through internal channels 78 of piston 70 and around post 52. Since wire 90 is wrapped around post 52 and fixed in one or more locations to piston 70 via set screws 82, contraction of wire 90 causes movement of piston 70 against spring 54 in a laterally-rightward direction when looking to FIG. 1A. Consequently, balls 56 are free to move from their initial, locked location within recesses 28 of fixed housing 20, to a secondary, unlocked location against shaft 76 of piston 70, as shown in FIG. 1B. Due to the geometry of tapered section 73 of bushing 72 and the geometry of the tapered section of recesses 28, balls 56 are forced inward towards shaft 76 of piston 70. In particular, piston 70 moves laterally right by a distance sufficient to move bushing 72 beyond the extent of recesses 28, thereby providing space for balls 76 to move inward. Since balls 56 are in contact with openings 60 of plunger 40, and spring 27 is constantly biased to move plunger 40 laterally left, plunger 40 moves balls 56 against the tapered section of recesses 28 causing balls 58 to move out of recesses 28 towards piston 70. Balls 56 therefore move from a first orientation in which balls 56 contact both fixed housing 20 and plunger 40 (e.g., via recesses 28 and openings 60, respectively) to lock housing 20 and plunger 40 relative to each other, to a second orientation in which balls 56 move inward towards shaft 76 of piston 70 and ride along the inside of hollow shaft 26 of fixed housing 20. In the second orientation, plunger 40 is unlocked and can freely translate relative to fixed housing 20.

With balls 56 in their unlocked position—caused by the contraction of wire 90 via an external stimulus (e.g., an electric current)—actuation mechanism 10 may move to its unlocked state, as shown in FIG. 1B. In particular, plunger 40 may be forced in a laterally-leftward direction when looking at FIG. 1B by way of spring 27 acting on flange 42 of plunger 40. In other words, since the movement of balls 56 has placed actuation mechanism 10 in an unlocked state as described above, and spring 27 is in a compressed state sandwiched between flange 42 of plunger 40 and groove 24 of fixed housing 20 when actuation mechanism 10 is in a locked state, spring 27 may act against flange 42 and cause plunger 40 to move laterally leftward, as reflected by the transition between FIGS. 1A-B. This allows other assemblies associated with actuation mechanism 10 (e.g., a flight controller for a missile) to become unlocked as well.

To manually reset actuation mechanism 10 into its locked state (FIG. 1A), wire 90 is allowed to cool and a tool (not shown) may be engaged with reset mechanism 58. The tool is used to pull plunger against spring 27 in a rightward direction relative to fixed housing 20 so that balls 56 move outward back into recesses 28 and cause plunger 40 to become locked again relative to fixed housing 20. In this regard, in a particular embodiment balls 56 may be biased outwards so that, as plunger 40 moves in a rightward direction relative to fixed housing 20, balls 56 automatically snap back into place within recesses 28 of fixed housing 20 once plunger 40 is moved far enough. This is achieved by way of piston 70 and bushing 72. For instance, balls 56 are able to snap back into recesses 28 because wire 90 has cooled and piston 70 is thereby moved back to its original location. With wire 90 cooled and allowed to expand, spring 54 constantly forces piston 70 in a leftward direction causing tapered section 73 of bushing 72 to force balls 56 outwards. Once plunger 40 is pulled so that balls 56 align with recesses 28, balls 56 will automatically snap back into place within recesses 28 and lock plunger 40 relative to fixed housing 20.

As noted previously, although reset mechanism 58 is a threaded bore in one embodiment, and tool likewise includes a threaded section (not shown) for connection with reset mechanism 58, other connection mechanisms can be used (e.g., press-fit, bayonetted connection, ball-and-detent mechanism, etc.) With actuation mechanism 10 in its locked state, as shown in FIG. 1A, actuation mechanism 10 can be used again, as needed. The manual reset mechanism 58 described above is also useful for testing actuation mechanism 10 prior to its use.

FIGS. 2 and 3A-B depict an alternate embodiment of actuation mechanism 10—actuation mechanism 10'—in use in the context of a missile sub-assembly 130. Actuation mechanism 10' includes the same structures and functionality as actuation mechanism 10, unless otherwise indicated. In that regard, like numerals refer to like elements in this embodiment, except that a prime series of reference numerals is used in the alternate embodiment for like elements, while new elements are accorded new reference numerals.

Missile sub-assembly 130 is a control assembly for controlling certain flight mechanisms in a missile, for instance the missile's fin(s) (not shown). Missile sub-assembly 130 includes a mounting 122 with an opening 124, and an output shaft 110 positioned in opening 124. Output shaft 110 is coupled to another mechanism (not shown) for moving the fins of the missile and thereby controlling the missile's flight.

Figure 4:
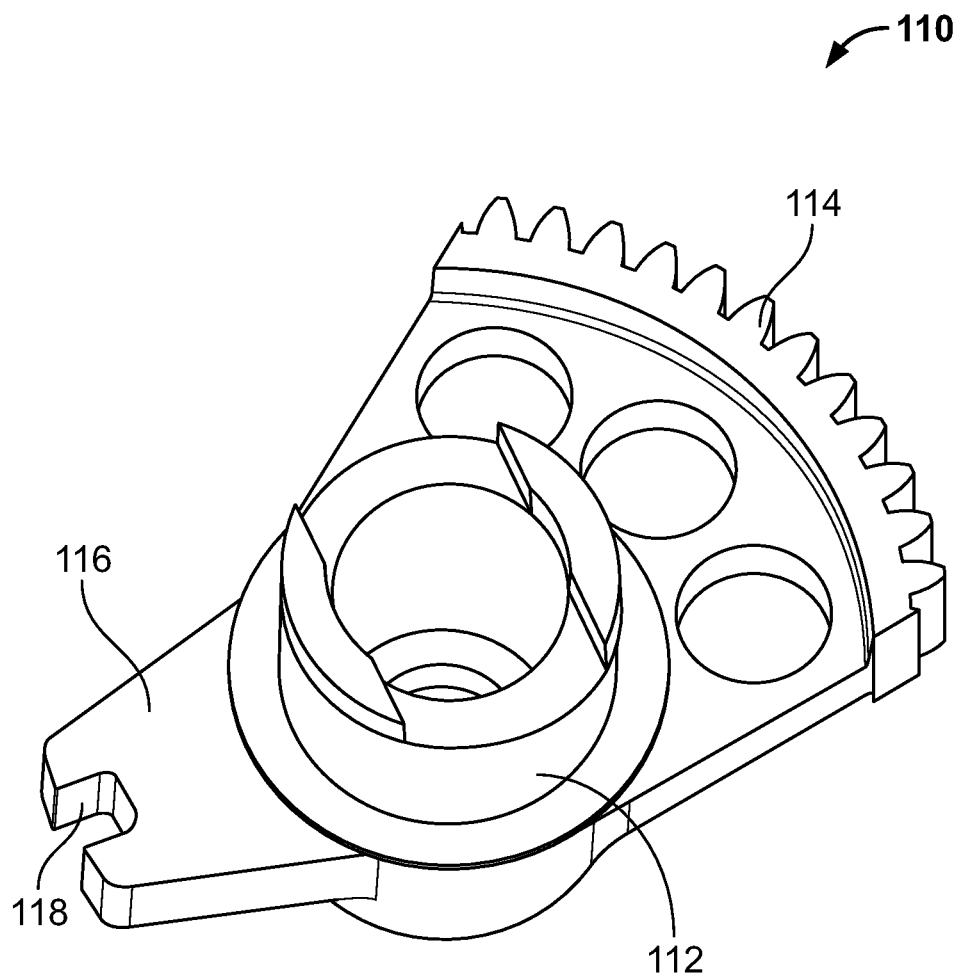
FIG. 4 is a perspective view of the output shaft forming part of the sub-assembly of FIGS. 2-3B.

As shown in FIGS. 3A-B and 4, output shaft 110 has a hollow cylindrical body 112 with gears or teeth 114 extending from a first side of body 112, and a projection 116 extending from a second side of body 112. Additionally, within opening 124 in mounting 122 are a set of bearings 120 surrounding body 112 of output shaft 110 to allow rotation of output shaft 110 within opening 124. Gears 114 of output shaft 110 may be connected to another gear mechanism (not shown) that is controlled by an on-board computing device or other control mechanism (not shown) designed to rotate output shaft 110 via gears 114 and control the flight of the missile by altering the position of the missile's fins. Stated differently, the missile may include an on-board computer or control mechanism that, in response to measuring various environmental flight conditions of the missile, can send a signal to control a gear mechanism (not shown) engaged with gears 114, thereby causing the gear mechanism (not shown) to move gears 114 and output shaft 110. Such movement—due to output shaft 110's direct or indirect connection to the fins of the missile—likewise causes movement of the missile's fins and causes the missile to fly in an appropriate manner.

At a second side of body 112, projection 116 may be included and in some cases projection 116 may have a detent 118. Detent 118 is used to engage with a portion of actuation mechanism 10' to either allow movement of output shaft 110 or lock output shaft 110 in a substantially immovable/non-rotatable position. Such operation is set forth more fully below, after the differences between actuation mechanisms 10, 10' are described.

The differences between actuation mechanisms 10, 10' are as follows. As shown in FIGS. 3A-B, a portion of mounting 122 is equivalent to fixed housing 20 from the previous embodiment—here referred to as fixed housing 20'. Fixed housing 20' is different from fixed housing 20 of the previous embodiment in so far as it is monolithic with mounting 122, but also because fixed housing 20' does not include a groove 24 for a spring. Instead, fixed housing 20' includes a hollow shaft 26' and a flange or stepped area 123, with spring 27' situated about hollow shaft 26' so as to abut flange 123. In the same way as the previous embodiment, actuation mechanism 10' includes a plunger 40' with a flange 42' that sandwiches spring 27' between flange 42' and flange 123 so that actuation mechanism 10' can operate in the same manner as actuation mechanism 10.

An additional difference between actuation mechanisms 10, 10' is that actuation mechanism 10' includes an O-ring or other sealing member 126 along its fixed housing 20' to seal hollow shaft 26'. In this regard, fixed housing 20' may include a tapered section for accommodating O-ring 126, as shown in FIGS. 3A-B. Actuation mechanism 10' also includes a different configuration of openings 80' and set screws 82' for its piston 70', and it includes a two-part piston 70' wherein main body 74' of piston 70' is separate from stepped shaft 76'. As shown in FIGS. 3A-B, main body 74' of piston 70' includes a set of openings 80' for set screws 82' that may function in the same manner as the previous embodiment—set screws 82' act to fix wire 90' to main body 74'. Alternatively, a first set screw 82' may fix wire 90' to main body 74', while a second set screw 82' can be used to connect a lead wire for the electrical hook up to shape memory alloy wire 90'.

Main body 74' is separate from stepped shaft 76' and is positioned outboard of flange 42' of plunger 40'. In this regard, main body 74' is somewhat larger in diameter than hollow shaft 44' of plunger 40' and abuts flange 42' thereof. As shown, main body 74' and stepped shaft 76' both still include internal channels 78' for receiving wire 90', much like above. Stepped shaft 76' is positioned inside hollow shaft 44' of plunger 40' and is configured to move from a locked position, as shown in FIG. 3A, to an unlocked position, as shown in FIG. 3B. Stepped shaft 76' may include its own mechanism for fixing wire 90' to stepped shaft 76' (e.g., an opening 80' and set screw 82' that functions to secure wire 90' to stepped shaft 76') so that, once wire 90' is actuated via an electric current or other stimulus, wire 90' shortens in length and causes stepped shaft 76' to move in a laterally-rightward direction when looking to FIG. 3A. This movement, as with actuation mechanism 10, then causes balls 56' to move out of recesses 28' and up against shaft 76' so that actuation mechanism 10' is unlocked. Spring 27' then acts against flange 42' of plunger 40' to cause plunger 40' to move outward away from fixed housing 20', in the same manner as actuation mechanism 10 set forth above.

When spring 27' causes plunger 40' to move outward and away from fixed housing 20', plunger 40' consequently also moves out of engagement with detent 118 in output shaft 110. This is shown in the progression between FIGS. 3A-B where it can be seen that plunger 40' moves out of the way of detent 118 of output shaft 110 so that output shaft 110 is free to rotate within mounting 122. In this manner, rotation of output shaft 110 can then be controlled by the on-board computer and associated gear mechanism (not shown) for the missile to operate the missile's fins, and thus its flight.

An alternate reset mechanism is also provided for actuation mechanism 10'. As shown in FIG. 2, the reset mechanism constitutes a bolt 142 having a set of projections 146 that contact flange 42' of plunger 40'. A set of arms 148 having openings 150 therein extend from mounting 122 and are sized to receive bolt 142 and allow bolt 142 to rotate within openings 150 (allowing rotation of projections 146 as well). In an embodiment, pins 152 are also provided and extend through arms 148 to retain bolt 142 in arms 148. Bolt 142 additionally includes a drive mechanism 144 (e.g., a hexagonal recess) for engagement with a tool (not shown) to rotate bolt 142 and projections 146 thereof.

To reset actuation mechanism 10', the tool (not shown) can be engaged with drive mechanism 144 and rotated to rotate bolt 142 in a counterclockwise direction. This rotation causes projections 146 to contact flange 42' of plunger 40' and move plunger 40' in a rightward direction when looking to FIGS. 3A-B. Consequently, plunger 40' may be moved rightward until actuation mechanism 10' is placed back into its locked state, as shown in FIG. 3A. The locked state for actuation mechanism 10' is the same as that for actuation mechanism 10, described above.

In the devices depicted in the figures, particular structures are shown that are adapted for use in an actuation mechanism and/or a missile. The use of alternative structures for such purposes, including structures having different lengths, shapes, and configurations is also contemplated. As an example, although in certain cases threaded mechanisms are used herein, other connection mechanisms can also be used, such as bayonetted connections, press-fit (e.g., interference fit) connections, camming connections, etc. In addition, it should be appreciated that actuation mechanisms 10, 10' can be used in multiple sub-assemblies for a missile to control the flight/fins thereof, although only one sub-assembly is described above. Further, other uses for actuation mechanisms 10, 10' are possible, including but not limited to replacing solenoid actuators on inflation valves. Inflation valves are typically one-time-use devices that use a solenoid to release a bayonet, which punctures a burst disk to then allow high pressure gas to escape from its pressurized cylinder. The high pressure gas can be used to do work, such as inflate a life raft, move an object, deploy a wing, etc. The actuation mechanisms 10, 10' herein are usable as a replacement to the solenoid actuator for the aforementioned inflation valves.

In addition, although springs are used in various instances in actuation mechanisms 10, 10', it is to be understood that other biasing members may be used as a substitute. For example, a compressible cylindrical disc may be used. Other locking mechanisms beyond balls 56, 56' may also be used, such as cylindrical rollers or round or square wire ring segments.

As another example, although the reset mechanism described above in connection with FIG. 2 is in the form of a bolt 142, any reset mechanism can be used that causes flange 42, 42' to move in a rightward direction, compressing spring 27, 27' and causing locking balls 56, 56' to move back into their locked position. For instance, a motor might be provided which is actuated via a wireless signal (e.g., an RF signal transmitted to a receiver associated with the motor). The motor could have a movable structure contacting flange 42, 42' and causing it to move in a rightward direction in response to the wireless signal.

Although aspects of the invention herein have been described with reference to particular embodiments, it is to be understood that these embodiments are merely illustrative of certain features of the present invention. It is therefore to be understood that numerous modifications may be made to the illustrative embodiments and that other arrangements may be devised without departing from the spirit and scope of the present invention as defined by the appended claims. For instance, the features described in connection with individual embodiments may be shared with others of the described embodiments.

It will also be appreciated that the various dependent claims and the features set forth therein can be combined in different ways than presented in the initial claims. In particular, each feature from the dependent claims may be shared with other features of other claims, to the extent technologically feasible, as if the claims were written in multiple dependent format.

The invention claimed is:

1. A method of operating an actuation mechanism comprising:
   positioning a plunger including at least one opening inside a bore in a housing, including at least one recess such that the plunger is locked directly to the housing;
   fixedly engaging a wire to a piston and to the plunger;
      subjecting the wire to a stimulus so that the length of the wire changes and causes the piston to move from a first position to a second position, the movement of the piston from the first position to the second position unlocking the plunger from the housing so that the plunger is free to move inside the bore relative to the housing; and
      engaging at least one locking element with the recess and the at least one opening in the plunger and moving the at least one locking element out of engagement with the recess when the piston is in the second position.

2. The method of operating an actuation mechanism as claimed in claim 1, wherein the stimulus is an electric current, a temperature stimulus, or a combination thereof.

3. The method of operating an actuation mechanism as claimed in claim 1, further comprising moving the piston inside a bore in the plunger from the first position to the second position.

4. The method of operating an actuation mechanism as claimed in claim 1, wherein the wire is composed of a material selected from the group consisting of a shape-memory alloy and a nickel-titanium shape memory allow.

5. The method of operating an actuation mechanism as claimed in claim 1, further comprising moving the plunger relative to the housing when unlocked.

6. The method of operating an actuation mechanism as claimed in claim 5, further comprising causing an output shaft associated with a missile sub-assembly to move after the plunger and housing are unlocked, the output shaft coupled to a fin for controlling the flight of the missile.

7. The method of operating an actuation mechanism as claimed in claim 5, further comprising expanding a spring engaged with the plunger and the housing to move the plunger relative to the housing.

8. The method of operating an actuation mechanism as claimed in claim 1, further comprising moving the piston from the first position to the second position against the force of a spring positioned inside the plunger.

9. The method of operating an actuation mechanism as claimed in claim 1, wherein the piston has at least one internal channel and the wire extends through the at least one internal channel.

* * * * *